(No Model.)
H. G. CADY.
TIRE SHRINKER AND EXPANDER.
No. 384,822. Patented June 19, 1888.
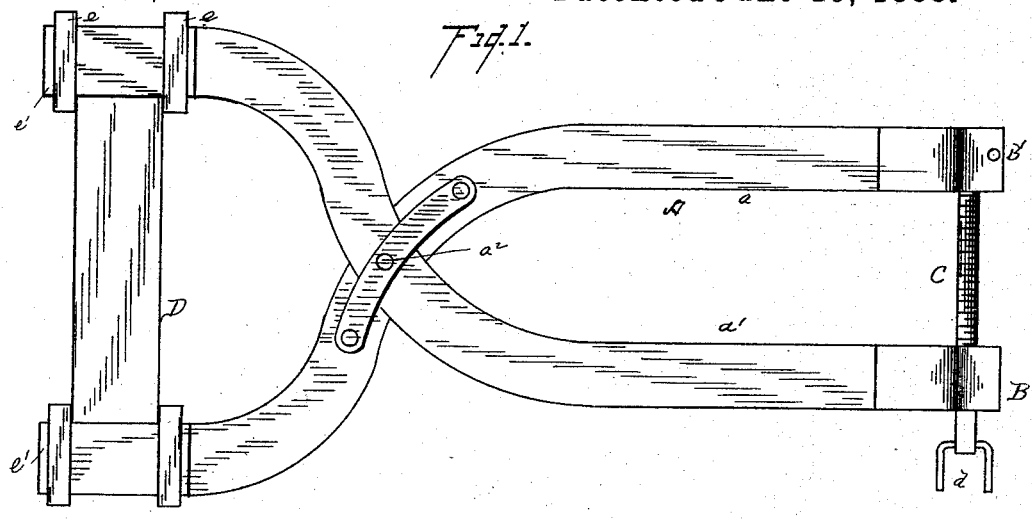
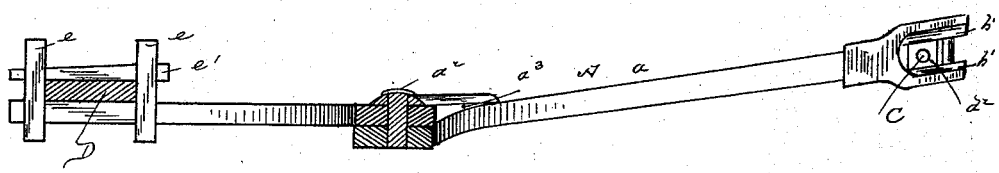
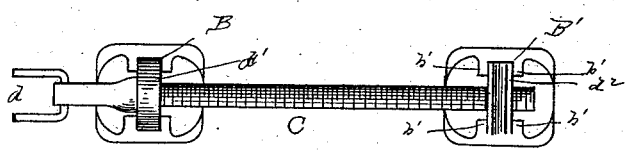
WITNESSES.
John Montgomery.
Geo. Fox
INVENTOR.
Henry G. Cady.
By Myers & Co.
Attorneys.

United States Patent Office.

HENRY G. CADY, OF PINE BLUFF, ARKANSAS.

TIRE SHRINKER AND EXPANDER.

SPECIFICATION forming part of Letters Patent No. 384,822, dated June 19, 1888.

Application filed April 12, 1888. Serial No. 270,436. (No model.)

*To all whom it may concern:*

Be it known that I, HENRY G. CADY, a citizen of the United States of America, residing at Pine Bluff, in the county of Jefferson and State of Arkansas, have invented certain new and useful Improvements in Tire Shrinkers and Expanders, of which the following is a specification, reference being had therein to the accompanying drawings.

This invention pertains to certain new and useful improvements in tire shrinkers or expanders, having for its object the provision of simple and highly efficient means for holding or securing a tire while being heated and for expanding or compressing the same while hot and in the fire or heating medium.

To this end the invention comprises the detail construction, combination, and arrangement of parts, substantially as hereinafter fully set forth, and particularly pointed out in the claims.

In the accompanying drawings, Figure 1 is a plan view of my invention. Fig. 2 is a central longitudinal sectional view thereof, and Fig. 3 is an end view.

Referring to the drawings, A designates my improved tire shrinker and expander, composed of two lever-arms, $a$ $a'$, fulcrumed by a pin, $a^2$, as shown. The lever-arm $a$ is passed through a loop, $a^3$, formed by a piece or strip of metal passed over the same and secured at its ends to the lever-arm $a'$. The rear portions of the lever-arms $a$ $a'$ are slightly curved, as shown at $b$, and in their outer thickened ends are formed grooves or recesses B B'. Each wall of these grooves or recesses has projections $b'$ $b'$, as shown, those of the walls of each groove being oppositely disposed.

C is a screw-threaded rod having a handle end, $d$, near which is rigidly secured on said rod a circular collar, $d'$, designed to rest in the groove B between the lugs or projections thereof, by which the same is held in position. This rod is passed through a nut, $d^2$, rigidly secured in the groove or recess B' of the lever-arm $a'$, between the lugs or projections $b'$ thereof.

In practice the tire D (a portion being shown in Fig. 1) is held on the outer ends of the lever-arms $a$ $a'$ by means of links $e$ $e$ and wedges $e'$, driven between said tire and links. When a tire is thus secured, the same is placed in the fire by which it is to be heated, and after withdrawal therefrom and while hot it is shrunk or expanded the desired extent by simply turning the threaded rod C, which will effect the opening or contraction of the ends of the lever-arms, as is obvious. By this means the operator is enabled to readily and easily secure the tire at the desired size, and without the necessity of employing other instruments or tools in acting upon the tire after its withdrawal from the fire, and by this means the loss of heat usually occasioned in securing hold on the tire or bar after the same is removed from the fire is prevented, as said tire or bar can be acted upon by moving the lever-arm while in the fire or heating medium.

I claim as my invention—

1. As an improvement in tire shrinkers or expanders, the lever-arms having the threaded rod connecting their ends, substantially as shown and described.

2. The lever-arms having the grooves in their ends, and the threaded rod having a collar and working in a nut in one of said grooves, substantially as shown and described.

3. The lever-arms having the tire secured to their forward ends by links and wedges, and the threaded rod working in the other ends of said lever-arms, substantially as shown and described.

4. The herein-described improved tire shrinker and expander, comprising the lever-arms having the grooved ends, the links and wedges, the threaded rod having the circular collar, and the nut secured in one of said grooved ends, substantially as shown and described.

In testimony whereof I affix my signature in presence of two witnesses.

HENRY G. CADY.

Witnesses:
J. W. PARSE,
J. W. CRAWFORD.